United States Patent [19]
Erwin

[11] 3,821,567
[45] June 28, 1974

[54] MEANS CORRECTING A WRONG-WAY DIRECTIONAL ROTATION OF A ROTATING MEMBER

[75] Inventor: Robert Dale Erwin, Indianapolis, Ind.

[73] Assignee: P. R. Mallory & Co. Inc., Indianapolis, Ind.

[22] Filed: Feb. 9, 1973

[21] Appl. No.: 331,022

[52] U.S. Cl. ................................................ 310/41
[51] Int. Cl. ............................................ H02k 7/10
[58] Field of Search .............. 310/41, 77, 154, 164; 318/136

[56] References Cited
UNITED STATES PATENTS

| | | | |
|---|---|---|---|
| 2,293,994 | 8/1942 | McLoughlin | 310/41 UX |
| 3,027,469 | 3/1962 | Sidell | 310/41 |
| 3,284,649 | 11/1966 | Barlow | 310/41 |

Primary Examiner—J. D. Miller
Assistant Examiner—Robert J. Hickey
Attorney, Agent, or Firm—Richard H. Childress; Charles W. Hoffmann; Robert F. Meyer

[57] ABSTRACT

A rotor of a synchronous motor carries a projection such that when the rotor is axially displaced, the projection engages a stop means to stop a wrong-way directional rotation of the rotor. The stop means is a projection extending from the face of a gear driven by said motor.

10 Claims, 4 Drawing Figures

PATENTED JUN 28 1974 3,821,567

MEANS CORRECTING A WRONG-WAY DIRECTIONAL ROTATION OF A ROTATING MEMBER

The present invention relates to a means for preventing a continued wrong-way directional rotation of a rotating member. In the illustrated embodiment, this invention relates to permanent magnet synchronous motors and more particularly to means for providing a quiet rotational-directional control for such motors.

Synchronous motors are used in a wide variety of motor applications including clocks and timer switches for automatic clothes dryers. A motor of this type requires a directional system to insure starting in a correct direction. A shading means is sometimes used to provide a directional control, however, although this is a quiet system, it is more expensive than a mechanical directional control. A host of synchronous motors are available with mechanical direction control systems, but most are objectionably noisy.

The present invention provides an efficient and very quiet directional control for rotating members and, more specifically, for permanent magnet synchronous motors. A feature of this invention is the employment of a translational motion of a rotor along its axis to initiate the directional control of rotation.

Accordingly, it is an object of the present invention to provide a rotational direction control for a rotating member.

Another object of the invention is to provide a quiet and economical rotational direction control for a rotor of a permanent magnet synchronous motor.

Another object of the invention is to provide a rotational direction control for a rotor of a permanent magnet synchronous motor including a stop means preventing continued rotation of the rotating member in a wrong direction.

Still another object of the invention is to provide a rotational direction control for a rotor of a permanent magnet synchronous motor including means for axially displacing the rotor.

Yet another object of the invention is to provide a rotational direction control for a rotor of a permanent magnet synchronous motor wherein the rotor is segmented, and the means for axially displacing the rotor includes a cooperating ramp means carried by the segments.

Another object of the invention is to provide a rotational direction control for a rotor of a permanent magnet synchronous motor wherein the means axially displacing the rotor further comprises a forcing means to push the segments together.

Still another object of the invention is to provide a rotational direction control for a rotor of a permanent magnet synchronous motor that includes an engagement means carried by the rotor engaging a stop means upon displacement of the rotor.

These and other objects of the invention will become apparent from the following description taken in conjunction with the accompanying drawings wherein.

Generally speaking, the objects are accomplished by providing a means preventing a continued wrong-way directional rotation of a rotating member comprising a housing, a rotating member rotatably journaled in the housing, a stop means disposed in spaced relation to said rotating member, a means for axially displacing the rotating member, and engagement means carried by the rotating member, whereby the rotating member is axially displaced upon a wrong-way direction of the rotating member causing the engagement means to engage the stop means to bounce the rotating member back in a correct direction of rotation.

Figure 1:
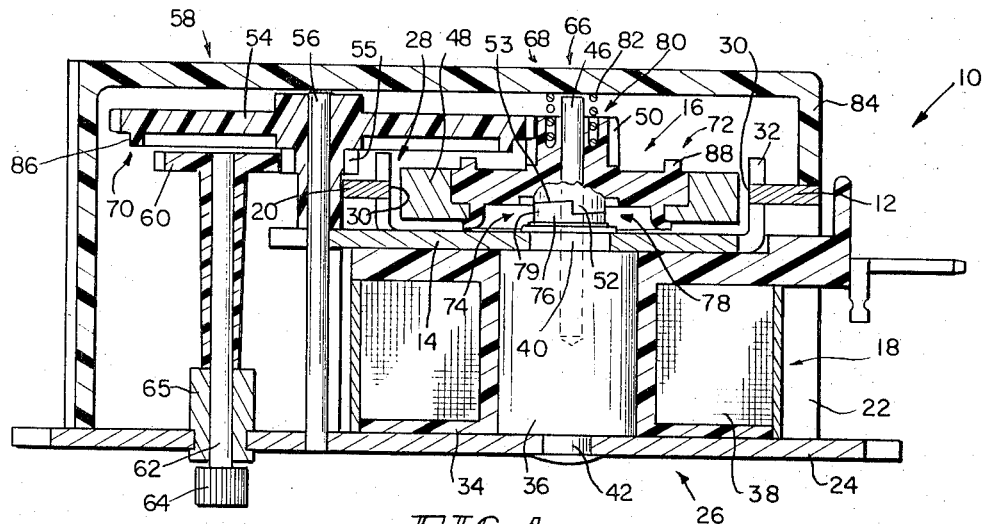
FIG. 1 is a sectional view illustrating an embodiment of the invention as it relates to a permanent magnet synchronous motor.

Referring to FIG. 1, a permanent magnet synchronous motor 10 includes an outer field plate 12, inner field plate 14, rotor 16, and energizing winding 18. The outer field plate 12 is substantially U-shaped including a flat bottom portion 20 and a pair of opposed upstanding legs 22 extending therefrom. The distal ends of the upstanding legs engage a mounting plate 24 to provide an enclosure 26 extending linearly to an area near the center of the mounting plate. There is an aperture 28 provided in the flat bottom portion 20 into which a plurality of poles 30 extend more or less generally in a circular fashion. The inner field plate 14 includes a substantially flat plate having integral poles 32 formed therefrom by lancing radial strips out of the plate. The poles are bent upwards to be intermeshed with the poles 30 of the outer field plate.

The energizing winding 18 includes a bobbin 34 surrounding an iron core 36 and a coil 38 of a predetermined number of turns of wire carried on the bobbin. The coil is electrically insulated. The iron core 36 includes a boss portion 40 which carries the inner field plate 14 and a stud 42 which serves to connect the core 36 to the mounting plate 24.

The rotor 16 includes a hub 44 which is rotatably carried on a rotor shaft 46. A permanent magnet 48 is carried on the hub. An output pinion 50 and a rotor cam 52 are both formed as part of the hub 44. The output pinion 50 engages a first stage gear 54 of a gear train rotatably journaled to rotate about a shaft 56. The rotor shaft 46 is rigidly held in the iron core 36. The permanent magnet 48 may be fabricated of a material of a relatively high energy product partially oriented ceramic, such as bariumferrite ceramic, with its outer periphery being impressed or magnetized into separate pole segments of alternate sets of poles of north and south polarity. As shown, the rotor 16 is disposed within the intermeshed poles of the inner and outer field plates 14 and 12 and rotatable therein.

A gear train 58 is coupled to the motor 10 through the output pinion 50 carried on the rotor 16. The gear train 58 comprises the first stage gear 54, a first stage pinion 55, a second stage gear 60, and an output pinion 64. Second stage gear 60 and output pinion 64 are carried on a shaft 60 rotatably journaled in a bushing 65. The bushing 65 is carried by the mounting plate 24.

In a synchronous motor such as described, a means is usually needed to insure that the rotor of the motor will start in the proper direction. In the present invention such means is provided by a directional means 66. Directional means 66 includes a displacement means 68, stop means 70 and engagement means 72. Displacement means 68 includes a cooperating ramp means 74 which includes the rotor cam 52 and a follower cam 76 responsive to the rotor cam. Rotor cam 52 and follower cam 76 are carried on segments 78 and 79 respectively. Segment 78 is carried on rotor 16, and segment 79 is a separate member rotatably journaled about rotor shaft 46. Segment 79 freely floats on the rotor shaft 46 resulting in a low noise operation.

Figure 4:
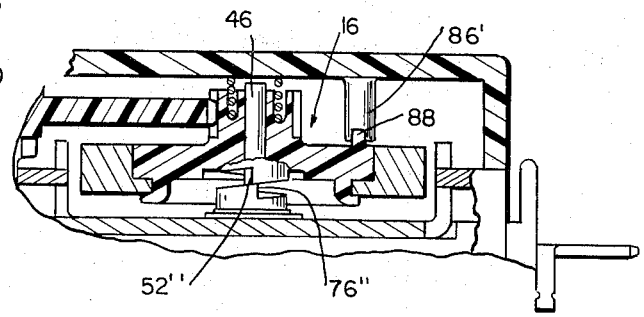
FIG. 4 is another modification of the stop means.

The rotor cam 52 is in the form of a substantially cylindrical ring with a longitudinal axis substantially coincident with a longitudinal axis of the rotor and has a cam surface 53' which is ramped with a rise running around the ring, dropping off abruptly to a start of the rise 52". The rotor cam 52 mates with the follower cam 76 which is substantially the same shape as the rotor cam, its longitudinal axis being substantially coincident with that of the rotor cam. Also included as part of the displacement means 68 is a forcing means 80 comprising a helical compression spring 82 which rests under load against the rotor 16 and a motor housing 84. Stop means 70 includes at least one stop projection 86 which extends from the first stage gear 54 in one of its embodiment. FIG. 4 shows another embodiment wherein the stop means comprises a stop projection 86' on a housing 84. Engagement means 72 comprises a projection 88 which is carried on the rotor 16 in a position relative to the stop means 70 so as to engage it upon axial rotor translation along the rotor shaft 46.

In operation, coil 38 is energized by an alternating electric current provided by leads, not shown, whereupon rotor 16 will turn in either a clockwise or counterclockwise direction. FIG. 1 illustrates an embodiment of the invention wherein the rotor desirably turns in a clockwise direction when the motor is in operation. In this mode the start of the rise 52" on rotor cam 52 engages a start of rise 76" on follower cam 76. And, rotor 16 and follower cam 76 rotate together in a clockwise direction in FIG. 1, spring 82 applying a force to insure their engagement.

Figure 2:
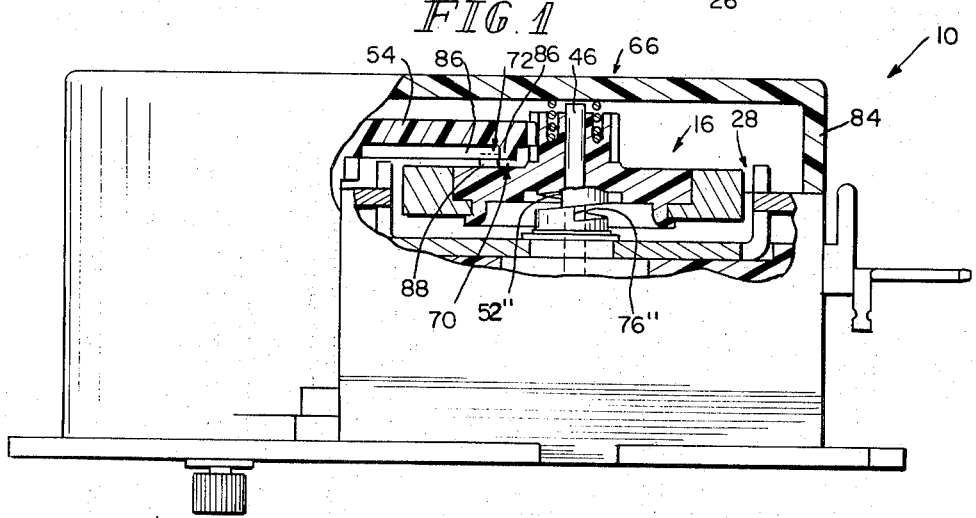
FIG. 2 is an elevation view with portions broken away to shown the rotor in another position.
Figure 3:
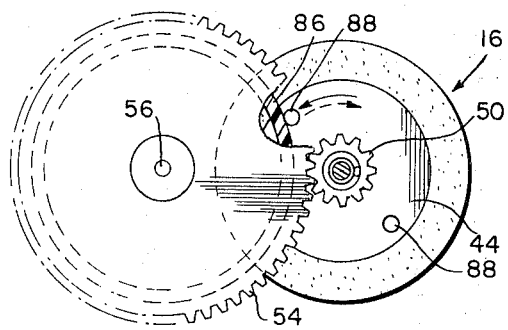
FIG. 3 is an isolated view of the rotor showing engagement and stop means.

Should the rotor 16 "take off" in a counter clockwise direction (wrong-way rotation) the rotor will ramp along the rotor shaft 46 toward the spring 82. The rotor 16 is shown ramped in FIGS. 2 and 4. This motion occurs because follower cam 76 is not as freely rotatable as the rotor 16 and therefore tends to lag behind when rotating in the counterwise (wrong-way) direction. The force of the spring 82 is light enough to allow rotor cam 52 to "ramp" the rotor 16 along the rotor shaft 46 as it turns faster than follower cam 76. After the rotor 16 has translated a predetermined distance, projection 88 engages the stop projection 86 thereby stopping the incorrectly rotating rotor and virtually bouncing it back in the correct direction. Once again turning in the clockwise direction, the rotor translates back along the shaft under the force of spring 82, and the start of the rises 52" and 76" re-engage whereupon the motor continues normal operation.

What is claimed is:

1. A synchronous motor including a gear train coupled thereto comprising:
   a. a field structure including inner and outer field plates;
   b. an energizing winding;
   c. a permanent-magnet rotor having a plurality of poles of opposite polarity and rotatable by an alternating field generated from said field structure;
   d. stop means extending from a face of a gear of said gear train;
   e. displacement means axially displacing said rotor;
   f. engagement means carried by said rotor engaging said stop means upon displacement of said rotor.

2. A synchronous motor according to claim 1 wherein said rotor is carried on a shaft.

3. A synchronous motor according to claim 2 wherein said rotor is segmented, and said displacement means includes cooperating ramp means carried by said segments.

4. A synchronous motor according to claim 3 wherein said cooperating ramp means comprises:
   a. a rotor cam carried on said rotor comprising a substantially cylindrical ring having a longitudinal axis substantially coincident with a longitudinal axis of said rotor and a cam surface having at least one rise disposed around said ring and terminating in an abrupt drop at a start of said rise; and
   b. a follower cam having a cam surface substantially the same shape as said rotor cam, said follower cam being rotatable about an axis substantially coincident with said rotor cam so that said rotor cam and said follower cam surfaces mesh together.

5. A synchronous motor according to claim 4 wherein said follower cam floats on said shaft.

6. A synchronous motor according to claim 4 wherein said displacement means further comprises forcing means pushing said follower cam and said rotor cam into engagement.

7. A synchronous motor according to claim 6 wherein said forcing means comprises a spring member.

8. A synchronous motor according to claim 7 wherein said spring member comprises a helical spring.

9. A synchronous motor according to claim 3 wherein said engagement means comprises at least one projection extending from said rotor.

10. Means preventing a continued wrongway directional rotation of a rotating member comprising:
    a. a housing;
    b. a first rotating member journaled in said housing;
    c. a plurality of rotating members coupled to said first rotating member;
    d. stop means disposed in spaced relation to said first rotating member and carried on one of said plurality of rotating members;
    e. means for axially displacing said first rotating member; and
    f. engagement means carried by said first rotating member engaging said stop means when said first rotating member is axially displaced.

* * * * *

UNITED STATES PATENT OFFICE
CERTIFICATE OF CORRECTION

Patent No. 3821567            Dated 2/9/73

Inventor(s) Robert Dale Erwin

It is certified that error appears in the above-identified patent and that said Letters Patent are hereby corrected as shown below:

Col. 1, line 66. Delete "shown" and substitute therefore ---show---

Col. 2, line 57, Delete "60" and substitute therefore ---62---

Signed and sealed this 15th day of April 1975.

(SEAL)
Attest:

RUTH C. MASON
Attesting Officer

C. MARSHALL DANN
Commissioner of Patents
and Trademarks